2 Sheets—Sheet 2.

P. E. BROWNING.
Grain-Drill.

No. 214,358. Patented April 15, 1879.

WITNESSES:
Henry N. Miller
C. Sedgwick

INVENTOR:
P. E. Browning
BY
ATTORNEYS.

UNITED STATES PATENT OFFICE.

PERRY E. BROWNING, OF BROWNINGSVILLE, KENTUCKY.

IMPROVEMENT IN GRAIN-DRILLS.

Specification forming part of Letters Patent No. 214,358, dated April 15, 1879; application filed January 4, 1879.

*To all whom it may concern:*

Be it known that I, PERRY E. BROWNING, of Browningsville, in the county of Bracken and State of Kentucky, have invented a new and useful Improvement in Grain-Drills, of which the following is a specification.

Figure 1:
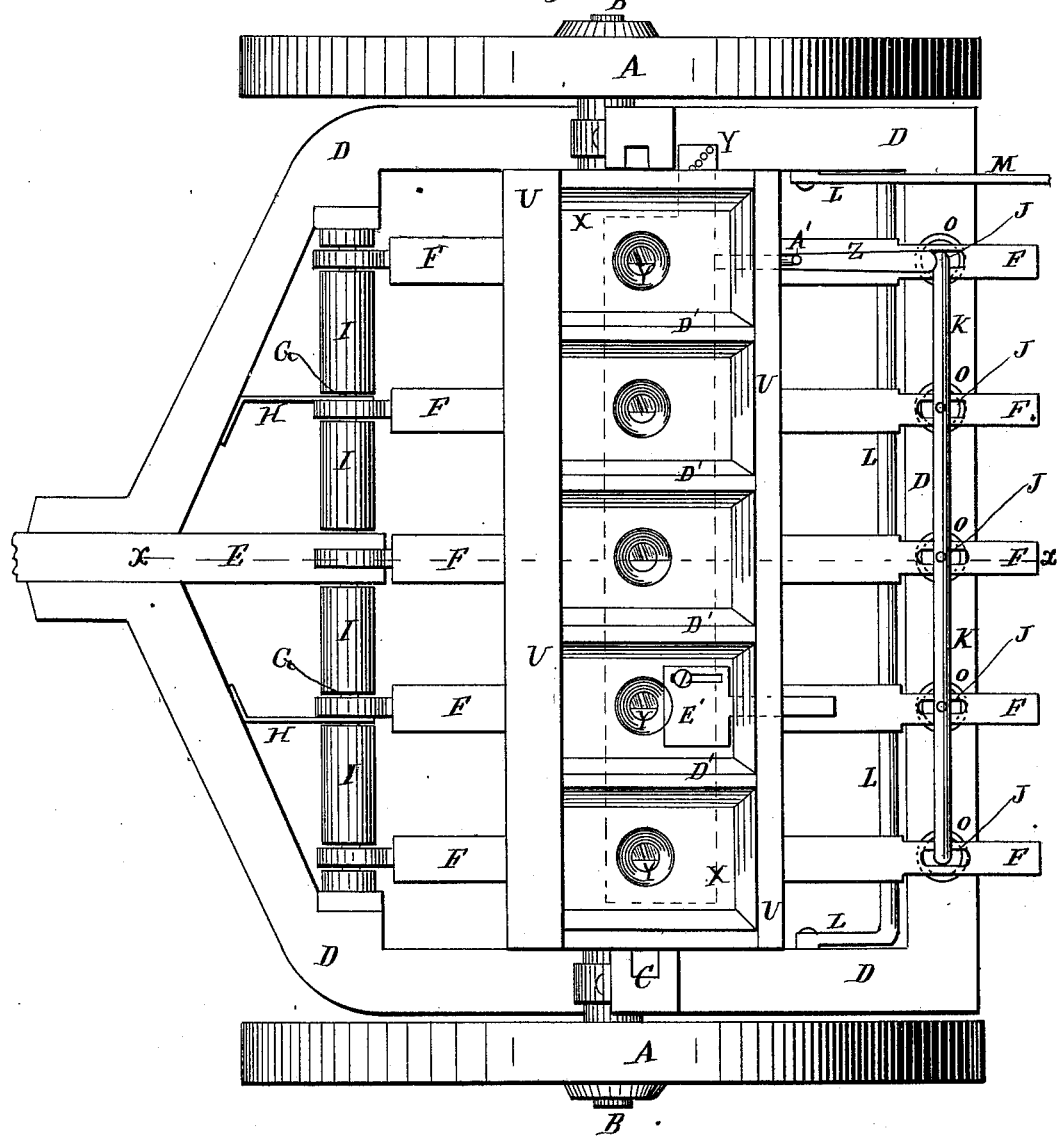
Figure 2:
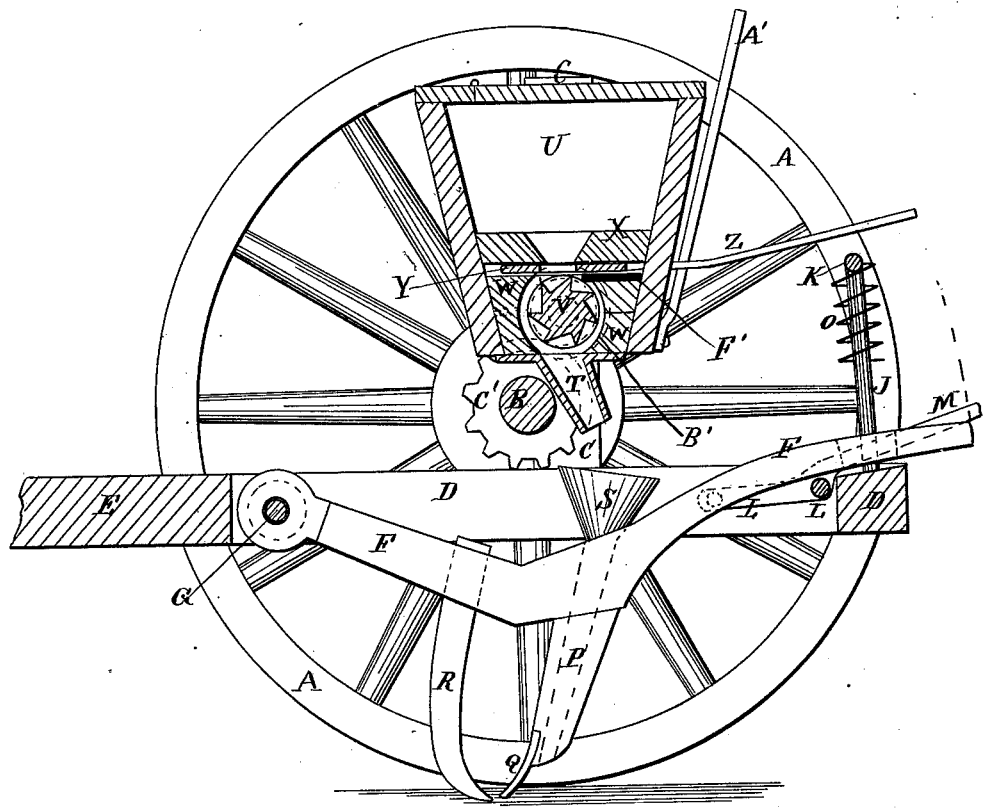
Figure 3:
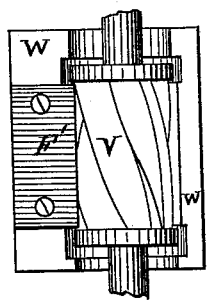

Figure 1, Sheet 1, is a top view of my improved machine, the cover of the seed-box being removed. Fig. 2, Sheet 2, is a vertical section of the same, taken through the line $x\,x$, Fig. 1. Fig. 3, Sheet 2, is a detail view of the lower side of a part of the feed-screw, showing the packing.

Similar letters of reference indicate corresponding parts.

The object of this invention is to furnish an improved machine for drilling wheat and other grain which shall be so constructed that it may be used effectively upon inclined, uneven, stony, or stumpy ground, and which shall be simple in construction, convenient in use, and reliable in operation, distributing the seed uniformly.

The invention consists of the curved beams, provided with cutters, spouts, and funnels, pivoted to the front part of the frame, and their rear ends slotted and extended to form handles, the guide-rods, the connecting-rods, and the springs, in combination with the frame, the pivoted rod, provided with a handle, and with the dropping mechanism of a grain-drill, as hereinafter more fully described.

A represents the wheels, one of which revolves loosely upon, and the other is rigidly attached to, the axle B, so as to carry the said axle with it in its revolution.

The axle B revolves in bearings attached to the forward side of the lower parts of the standards C, the lower ends of which are attached to the side bars of the frame D.

To the middle part of the forward end of the frame D is attached the tongue E, to which the draft is applied.

F are the plow-beams, which are made with a downward bend to pass beneath the axle B, to give so much space between them and the said axle B that they may be raised sufficiently to allow the plows to pass over obstructions.

The forward ends of the beams F have holes formed through them to receive the rod G, which passes through the rear end of the tongue E and the side bars of the frame D, and which is further supported against the draft-strain by the bars H. The bars H have holes formed in their rear ends to receive the rod G, and their forward ends are attached to the forward end of the frame D.

The forward ends of the beams F are kept at the proper distance apart by tubular washers I, placed between them upon the rod G. The rear ends of the beams F rise above and project in the rear of the rear cross-bar of the frame D, so that they may serve as handles for raising the plows from the ground separately, when desired.

In the rear parts of the beams F, above the rear cross-bar of the frame D, are formed short slots to receive the guide-rods J, to keep the said rear ends at the proper distance apart, and at the same time allow them to rise freely. The lower ends of the guide-rods J are attached to the rear cross-bar of the frame D, and their upper ends are attached to a connecting-rod, K, to keep them in proper relative positions. Beneath the beams F, at the forward side of the rear cross bar of the frame D, is placed a rod, L, the end parts of which, at the inner sides of the side bars of the said frame D, are bent forward at right angles, and are pivoted at their ends to the said side bars. To the rod L is rigidly attached a lever, M.

With this construction, by raising the lever M the crank-rod L will be turned upward, raising all the plows away from the ground at the same time. Upon the upper parts of the guide-rods J are placed spiral springs O, the upper ends of which rest against and are secured to the connecting-rod K, to give the beams F, when raised, a downward impulse, to prevent them from hanging or sticking in that position, and to secure a prompt descent when the obstruction has been passed. To the middle part of the beams F are attached the standards P, to the lower ends of which are attached the plows Q, to open channels to receive the seed. To the beams F, a little in front of the standards P, are attached the cutters R, the lower parts of which are curved to the rearward, and their lower ends are a little below the points of the plows Q.

With this construction, should a stone or other obstruction be in front of any of the plows, the cutters R will strike and slide over it, so as to prevent the plows from coming in contact with the said obstruction and being broken. As soon as the obstruction has been passed the plows drop into working position, the springs O resisting any tendency to stick or hang.

The standards P are perforated longitudinally, or are made hollow to serve as spouts to conduct the seed to the ground, and have funnels S attached to their upper ends to receive the seed and guide it into the cavities of the said standards P as it falls from the guide-spouts T, attached to the bottom of the seed-box U, around its discharge-openings.

The seed-box U is secured at its end to the standards C, and has square projections formed upon or attached to its ends to enter vertical grooves in the inner sides of the said standards. The bottom W of the seed-box U is made thick, and is perforated longitudinally to receive the screw V, the journals of which revolve in the vertical grooves in the inner sides of the standards C.

The feed-screw V is made in short sections, or is divided into short sections by ring-flanges; and in the said bottom, above and below each section, are formed openings for the seed to pass to the said screw, and to escape from it to the guide-spouts T.

Upon the bottom of the seed-box U, and between it and the false bottom X, is placed a sliding plate, Y, in which are formed openings corresponding with the openings in the false bottom X, so that by adjusting the said plate Y the openings that admit seed to the feed-screw V may be wholly or partly closed, to prevent or regulate the escape of the seed.

One end of the sliding plate Y projects at the end of the seed-box U, and has a number of holes formed through it to receive a pin to serve as a gage to limit the extent to which the discharge-openings are opened, and consequently the amount of seed sown to an acre.

The cut-off slide Y is adjusted by a lever, Z, attached to it, and which passes out through a slot in the rear side of the seed-box U, so that it may be operated by a person walking in the rear of the machine.

To the lower part of the rear side of the seed-box U is pivoted the lower end of a lever, A', which passes up through a hole in the lever Z, and projects above the said seed-box, so that it may be reached and operated to adjust the slide Y by a person sitting upon the cover of the seed-box U.

If desired, the lever Z may be connected with the lever M, so that the operation of raising the plow-beams F from the ground may close the discharge-openings of the seed-box U.

To the bottom W, beneath the slide Y, is attached a rubber packing, F', to rest against the threads of the screw V, to prevent the said screw from carrying out any more seed than enough to fill the spaces between its threads.

To the feed-screw V is attached a gear-wheel, B', which projects through a slot in the bottom W of the seed-box U, and its teeth mesh into the teeth of the gear-wheel C', attached to the axle B, so that the said feed-screw V may be rotated to sow the seed by the advance of the machine.

The seed-box U is divided into various compartments, corresponding with the sections of the feed-screw V, by partitions D', to prevent the seed from collecting in one end of the said seed-box when the machine is passing over uneven ground, and thus to insure a uniform distribution of the seed under all circumstances. In each of the compartments formed by the partitions D' is placed a slide, E', which passes in through a slot in the rear side of the seed-box U.

The movements of the slide E' are limited by a screw screwed into the false bottom X, and which passes through a slot in the said slide E'. The slides E' enable one or more of the discharge-openings to be closed, as circumstances may require, without affecting the others.

Having thus described my invention, I claim as new and desire to secure by Letters Patent—

The curved beams F, provided with the cutters R, the spouts P, and the funnels S, pivoted to the front part of the frame by the rod G, and their rear ends slotted and extended to form handles, the guide-rods J, the connecting-rod K, and the springs O, in combination with the frame D, the pivoted rod L, provided with the handle M, and the dropping mechanism of a grain-drill, substantially as and for the purpose described.

PERRY E. BROWNING.

Witnesses:
J. C. BROWNING,
U. R. RAVENSCRAFT.